Patented Sept. 11, 1951

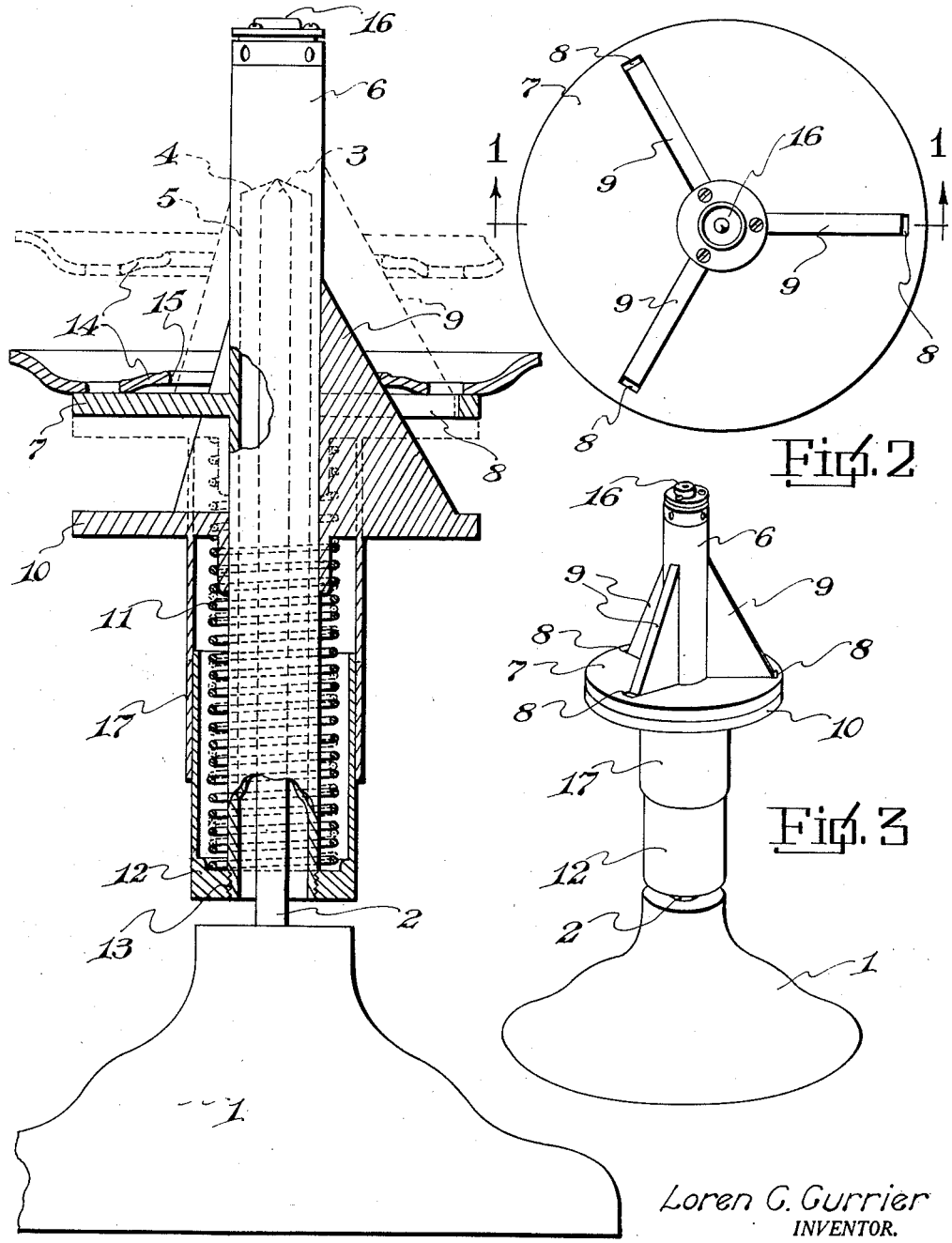

2,567,597

UNITED STATES PATENT OFFICE 2,567,597

WHEEL BALANCER

Loren C. Currier, Tulsa, Okla.

Application March 12, 1947, Serial No. 734,251

2 Claims. (Cl. 73—66)

The invention relates to wheel balancing machines, and has for its object to provide a device of this kind wherein a body member is balanced on a balance point and provided with a disc receiving flange and an upwardly spring pressed member beneath the disc receiving flange, and provided with triangularly shaped flanges which travel upwardly and downwardly through slots in the disc receiving flange, and adapted to engage the inner periphery of the wheel disc opening for centering the wheel.

A further object is to tension the spring sufficiently to force the centering flange disc towards the stationary body flange, but not sufficient to prevent the weight of the wheel, when placed on the centering flanges, from being forced downwardly by gravity until it rests on the stationary body flange.

A further object is to provide a spirit level on the upper end of the body member above the balance point for indicating the level of the wheel receiving flange.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical transverse sectional view through the wheel balancer, taken on line I—I of Figure 2.

Figure 2 is a top plan view of the device.

Figure 3 is a perspective view of the centering machine, showing the parts in normal position, ready to receive a wheel.

Referring to the drawing, the numeral I designates the base of the machine, which base is provided with a vertically disposed pointed rod 2, the upper end being pointed as at 3, to form a balance point, in the bottom of the frustoconically shaped end 4 of the chamber 5 of the tubular body portion 6. The body portion 6, at a point spaced from its upper end, is provided with a horizontal disc wheel receiving flange 7, preferably formed integral with the body.

Flange 7, at spaced points therein, is provided with radial wedge receiving slots 8, through which slots the upwardly extending wedges 9 extend around the body 6, and which wedges, along with the wedge flange 10, are normally forced upwardly by the spring 11. Spring 11 surrounds the body 6 and is interposed between the wedge carrying flange 10 and the lower end of a sleeve 12, which is threaded at 13 on the lower end of the body. Spring 11 is sufficiently strong to normally force the centering wedges 9 upwardly through the disc receiving flange 7 to the position shown in Figure 3, however this spring action is not sufficiently strong to overcome the weight of the disc 14 of the wheel when the disc is passed over the upper end of the body 6 to a position shown in dotted lines in Figure 1, hence it will be seen that the centering wedges 9 will cooperate with the central opening 15 in the disc 14, thereby centering the disc 14 and the weight of the disc and wheel will then overcome the spring action of the spring 11 until the disc rests on the flange 7, and at which time the operator can observe the spirit level 16 on the upper end of the body 6, and then can properly balance the wheel in the usual manner.

It will be noted that only three centering wedges 9 are shown, as this has been found to give the best result, as it gives a three point engagement with the disc.

Extending downwardly from the under side of the wedge carrying flange 10 is a sleeve 17 which telescopically engages with the sleeve 12 carried by the body 6. This particular telescopic engagement protects the spring from foreign matter, and from damage.

From the above it will be seen that a wheel centering device is provided which is simple in construction, the parts reduced to a minimum, and one wherein the centering operation is positive.

The invention having been set forth what is claimed as new and useful is:

1. A wheel balancing machine comprising a base, a vertically disposed pointed rod carried by said base, a vertically disposed chambered body member having the lower end of its chamber open, said pointed rod having a balance point engagement in the upper end of the body member chamber on the axis of the chambered body member, said pointed rod being smaller in diameter than the diameter of the chamber of the chambered body member, an integral horizontal wheel supporting flange carried by the body member and surrounding the chambered body member and adapted to support thereon a wheel to be centered through an opening in the wheel, a horizontally disposed wedge carrying flange surrounding the chambered member below the first mentioned flange and movable upwardly towards and downwardly away from the first mentioned flange for centering the wheel thereon, said wedge carrying flange having upwardly extending wedges radially disposed in relation to the axis of the chambered body member and extending through radial slots in the first mentioned flange around the chambered body member, a tubular member surrounding the chambered body member in spaced relation thereto and threaded on the lower end of the body member and extending upwardly over the lower end of the chambered body member and an expansion spring within said tubular member and interposed between the lower end thereof and the under side of the wedge carrying flange and normally urging the wedges upwardly through the slots in the body carried flange.

2. A device as set forth in claim 1 including a downwardly extending tubular member carried by the under side of the wedge carrying flange and having a sliding interengagement with the upper end of the tubular member carried by the lower end of the chambered body member, and surrounding the spring.

LOREN C. CURRIER.

REFERENCES CITED

The following references are of record in the file of this patent:

UNITED STATES PATENTS

| Number | Name | Date |
| --- | --- | --- |
| 2,233,371 | Smith | Feb. 25, 1941 |
| 2,502,633 | Shepard | Apr. 4, 1950 |